July 22, 1941.   R. W. POINTER   2,250,134
VEHICLE SUSPENSION
Filed May 4, 1940   2 Sheets-Sheet 1

ROBERT W. POINTER
INVENTOR
BY
ATTORNEY

July 22, 1941.  R. W. POINTER  2,250,134
VEHICLE SUSPENSION
Filed May 4, 1940  2 Sheets-Sheet 2
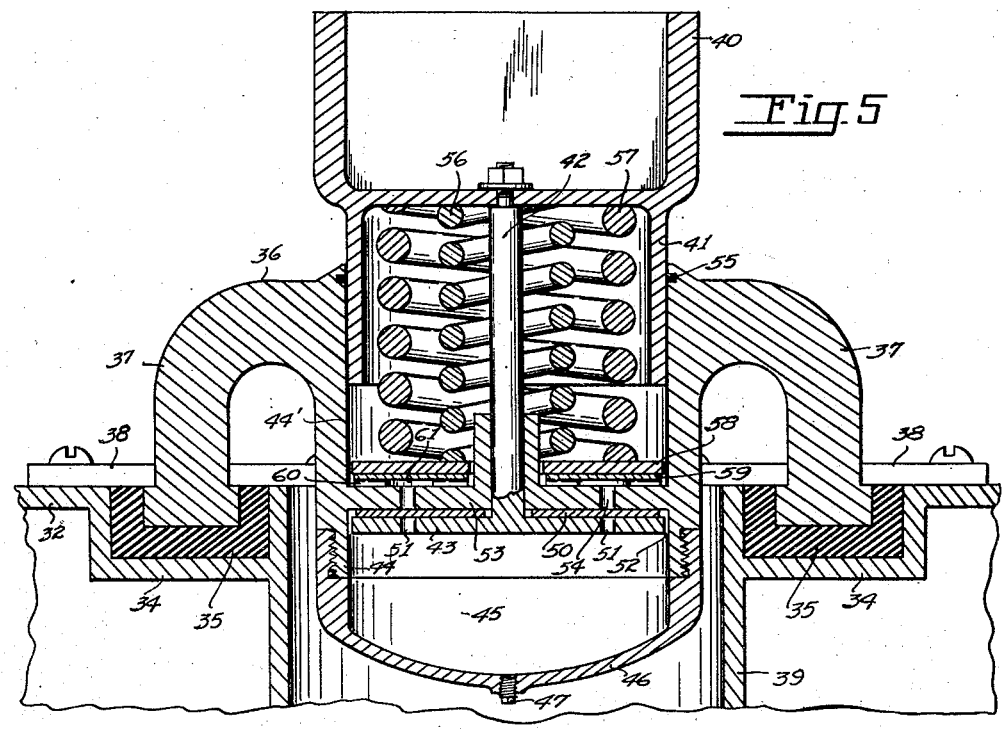
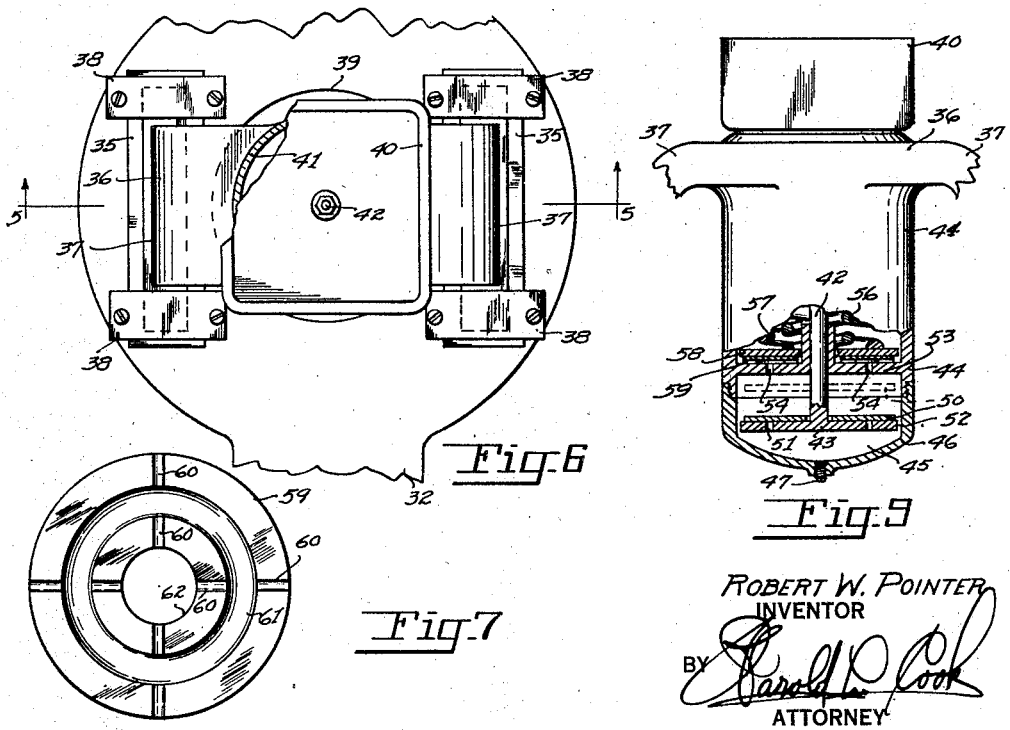
ROBERT W. POINTER
INVENTOR
BY
ATTORNEY Patented July 22, 1941

2,250,134

UNITED STATES PATENT OFFICE 2,250,134

VEHICLE SUSPENSION

Robert W. Pointer, Portland, Oreg., assignor of one-half to Willamette Iron & Steel Corporation, Portland, Oreg., a corporation of Oregon Application May 4, 1940, Serial No. 333,350

3 Claims. (Cl. 280—124)

This invention relates to an improved vehicle suspension, and is particularly adapted for extreme heavy duty use in connection with automotive trucks, trailers and the like.

In the hauling of extremely heavy loads on vehicle trailers, as is done in the logging industry, for example, new problems and conditions are being encountered which prove certain parts of existing equipment inadequate and often inoperative for the tasks assigned to it. These new problems and conditions arise largely through the ever increasing speed and capacity of large hauling units. More powerful motors and tougher metals invite the carrying of loads which are so heavy that they greatly overtax certain parts of the equipment. In the logging industry in certain parts of the country the size of the trailer loads of giant Douglas fir and ponderosa pine logs is ever increasing, as well as the speed with which they are transported.

One part of the conventional hauling equipment which has proved inadequate to meet the new conditions is the suspension and shock absorber mechanism. A critical and hazardous situation frequently develops from repeating irregularities, or undulations, in the road surface tending to induce rhythmic swaying or bouncing of the entire load as a unit. This phenomenon may occur on unsurfaced roads or on almost any type of hard surfaced roads. Even concrete roads, which may appear to the eye to have a perfectly smooth surface, may sag or dip between the expansion joints so as to induce a rythmic bouncing of the load. At a certain speed on such a road the amplitude of the bouncing may increase until the entire load periodically rises clear of the bed of the trailer, creating a hazard which is likely to get beyond the control of the driver.

The invention is herein illustrated and described as applied to a fifth wheel type coupler and to a combination load supporting spring and rebound snubber. In its more practical embodiment the device takes the form of telescopically mounted tubular members these being supported in extended position by springs enclosed therewithin, one of the tubular members having formed therewith a piston operable in a cylinder formed within the other tubular member, the piston being urged toward a limit of its movement by the action of the springs.

The embodiment of the present invention in a fifth wheel type coupling materially lessens the hazards heretofore created by reason of failure of such couplings to respond readily to changes in the direction of travel. As is well known, fifth wheel type couplings commonly take the form of disc or plate like surfaces rotatively mounted one upon the other, the resistance offered by friction therebetween tending to increase as the load is increased. With such constructions, swaying or jerking from side to side often results from frictional resistance to changes in direction of travel. In the present construction, the frictional resistance offered by the end surfaces of the coil springs is relatively slight, and the coupling responds readily to changes in direction of travel.

When used in place of the usual vehicle suspension mechanism, the invention eliminates the use of conventional leaf springs, and because spring shackles, blocks and the like are likewise eliminated, a very considerable reduction in the weight of the vehicle is effected.

The primary object of the present invention is to provide an improved type of suspension which will overcome, to a large degree the above-noted defects in present types of vehicle suspensions. A particular object is to provide an improved shock absorber or rebound snubber for heavy duty vehicles and the like.

A further object is to provide an improved fifth wheel type coupling for heavy duty vehicles.

A further particular object is to provide an improved shock absorber or snubber for the fifth wheel in a trailer attachment.

In the attainment of these objects it is to be understood that the invention is not intended to be limited to automotive trucks, trailers and the like, inasmuch as it is of general application for the suspension of bodies requiring a resilient, shock absorbing support. In addition to trucks and trailers, the construction of the present invention is of particular advantage and utility in the suspension of railway cars, mobile guns and other heavy equipment.

The above mentioned objects and advantages, as well as additional objects and advantages, will be apparent as the description proceeds in connection with the accompanying drawings.

In the drawings:

Figure 5 is an enlarged fragmentary sectional view corresponding to the showing in Figure 4 and taken on the line 5—5 of Figure 6.

Figure 6 is a top plan view of the construction shown in Figure 5 with certain parts broken away for clearness.

Figure 7 is a bottom plan view of the wearing plate shown in Figures 5 and 9.

Figure 9 is a side elevation of applicant's novel suspension with parts broken away to show the position of various elements when the device is under load.

Figure 1:
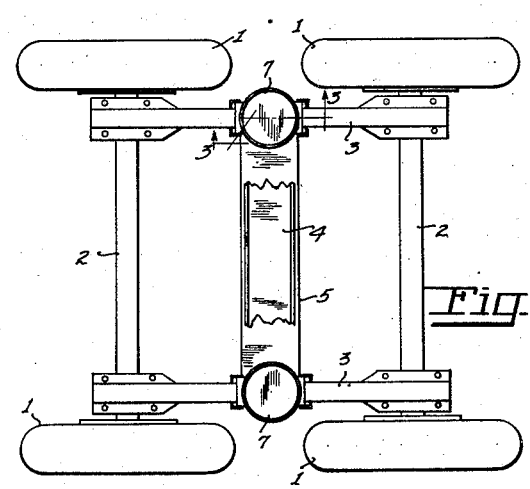
Figure 1 is a top plan view of a tandem trailer unit embodying the novel vehicle suspension forming the subject matter of the present invention.
Figure 2:
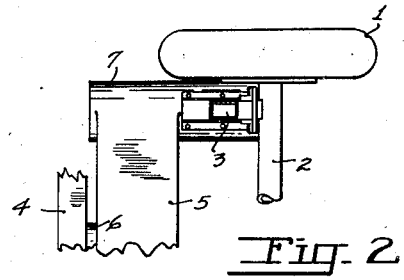
Figure 2 is a fragmentary end elevation view of the parts shown in Figure 1.
Figure 3:
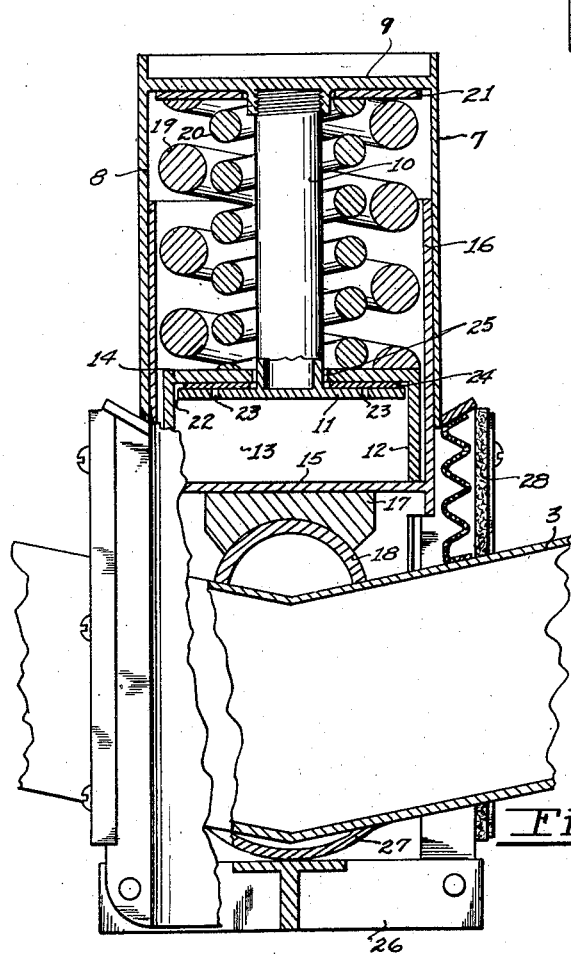
Figure 3 is a section showing the details of a preferred embodiment of the invention, and is taken on the line 3—3 of Figure 1.

The manner of application of the construction of the present invention to a tandem trailer unit is illustrated in Figures 1, 2 and 3. In Figure 1 the road wheels 1 are mounted upon the two axles 2, 2. The axles 2 are carried at the extremities of walking beams 3, 3 so as to have a limited pivotal movement about the point of load support. The load upon the trailer rests upon the bed frame 4 which is carried by the transverse beam 5, being pivotally mounted thereon as indicated at 6. The transverse beam 5 carries at its extremities cylindrical portions 7, 7 housing the novel construction embodying the present invention. Thus it is seen that the weight of the load carried upon bed frame 4 is transmitted through the pivotal connection 6 to the tranverse beam 5 and thence through the suspension mechanism in the cylinders 7 to the walking beams 3 carrying the road wheels 1.

The construction of the vehicle suspension forming the subject matter of the present invention is illustrated in detail in Figure 3. The weight of the load borne by the transverse beam 5 is transmitted to the outer shell 8 which is a part of the cylindrical portion indicated generally at 7. The outer shell 8 is welded or otherwise made solid and integral with the transverse beam 5. The shell 8 carries the integral end portion 9 which is provided with means for supporting the rigid bolt or piston rod 10 in the relationship illustrated. A plate or piston-like member 11 is fixed to the lower end of the piston rod 10 so as to operate freely within the cylindrical walls 12 bounding the chamber 13. The cylindrical walls 12 carry a top bearing surface 14, and, together with the bottom plate 15, define the liquid chamber 13. Bottom plate 15 carries the upstanding walls 16 therearound in the manner illustrated. To the under side of the bottom plate 15 is attached the open bearing blocks 17 adapted to bear upon the semicylindrical bearing surface 18 on the walking beam 3. Coil springs 19 and 20 transmit the load from the integral end portion 9 to the bearing surface 14, from whence it is further transmitted by the cylindrical walls 12 to the bottom plate 15 and thence to the walking beam 3.

Figure 3 illustrates the parts as they would appear with no load thereon, the springs 19 and 20 being extended to the limit of their action as determined by the length of the piston rod 10, which is secured in the manners illustrated, to the integral end portion 9 and the plate 11. A wearing plate 21 is provided to form a bearing surface for the upper ends of the springs 19 and 20.

In operation the chamber 13 is filled with oil or other suitable liquid, and the weight of the load will cause the plate 11 to occupy a position intermediate between the end walls 14 and 15 of the chamber 13. The action of the springs 19 and 20 will result in the plate 11 having a reciprocating or piston-like motion within the chamber 13. A small clearance 22 is provided around the edges of the plate 11 to provide restricted passage for the interchange of liquid on opposite sides of the plate 11 as the latter reciprocates. It is desired that the clearance 22 be such that considerable resistance is offered to the interchange of oil upon the movement of the plate 11. This resistance, however, will be the same for either direction of motion of the plate 11.

Further means are provided for the passage of liquid from the bottom side of the plate 11 to the top side, such means being the openings 23. Resting freely upon the top side of the plate 11 and covering the openings 23 therein is the floating plate 24, which constitutes an important feature of the present invention. When the plate 11 is caused to move rapidly downwardly, liquid within the chamber 13 will be forced around the edges of the plate 11 by virtue of the clearance 22 and will also be forced through the openings 23. The velocity of the downward motion of the plate 11 will depend upon the resistance offered to the flow of liquid through and around the plate 11. When the plate 11 is caused to move downwardly with a relatively high velocity the inertia of the floating plate 24 will cause it to uncover the openings 23, whereupon it will slowly follow the plate 11 downwardly until it comes to rest on the plate 11, again closing the openings 23. The pressure of liquid tending to escape through the openings 23 will also tend to keep the parts 11 and 24 separated as long as plate 11 is experiencing a downward motion.

If the load be suddenly removed so that the springs 19 and 20 tend to produce rapid upward motion of the plate 11, such motion will be resisted by the piston action of the plate 11 with the openings 23 covered by the plate 24. When the plate 11 moves upwardly it will be seen that liquid can pass around the edges by way of the clearance 22, but cannot pass through the openings 23, thus providing a snubbing action or a rebound check which is of greater effectiveness than the resistance to downward motion of the load.

Apertures 25 are provided for the escape of surplus liquid from the chamber 13. In the illustrated embodiment the cylindrical walls 12 merely rest upon the bottom plate 15 under the pressure of the springs 19 and 20, this being sufficient to establish a liquid tight joint between the members 12 and 15.

To prevent the parts from becoming dissociated upon rebound, a yoke 26 attached to the outer shell 8 encircles the walking beam 3 and effects a contact with a bearing portion 27 thereon. Flexible material 28 is provided to keep foreign matter out of the moving parts, regardless of the motion or position of the outer shell 8.

Figure 4:
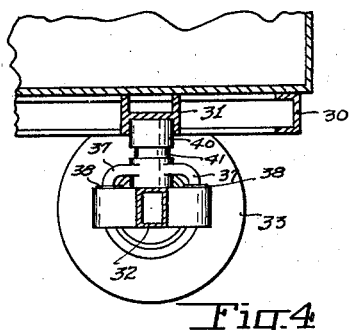
Figure 4 illustrates an embodiment of the present invention applied to the fifth wheel of a full trailer, certain parts being broken away and certain parts being shown in section.

In Figure 4 the construction of the present invention is illustrated in application to the fifth wheel of a full trailer. The trailer has a frame 30 carrying a cross member 31, to the central portion of which is attached the fifth wheel. Through the agency of the fifth wheel, well understood in the art, the axle 32 carrying road wheels 33 may pivot after the manner of the wagon axle.

Figures 5 and 6 are enlarged views of applicant's improved fifth wheel construction embodying the principles of the present invention. The axle 32 contains a central opening bounded by the walls 39 and the recess or pocket 34 carrying cushioning material 35 therein. The novel fifth wheel is indicated generally at 36, and has oppositely disposed and downwardly depending arms 37 supporting the structure in the cushioning blocks 35. Plates 38 are provided to secure the assemblage in the relationship illustrated. Functionally the structure of Figure 5 is similar to the structure of Figure 3, and differs only in the manner of attachment to the load carrying parts.

An upstanding flange 40 is provided for attachment by welding or other convenient means, to the cross member 31 on the trailer frame 30. The flange 40 carries an integral depending sleeve 41 and a bolt or piston rod 42. The lower end of the piston rod 42 carries the piston or plate 43 in operative reciprocating relation with the cylinder walls 44 laterally bounding the chamber indicated generally at 45. In the illustrated embodiment the chamber 45 is bounded on its bottom side by a removable closure member 46 carrying a drain plug 47. As in the previously described embodiment, a floating plate 50 rests freely upon the upper surface of the plate 43 so as to cover openings 51 therein. In addition to the openings 51, a peripheral clearance is provided at 52 for the interchange of liquid under considerable resistance from one side of the plate 43 to the other as the latter moves within the chamber 45.

The cylinder walls 44 in the illustrated embodiment constitute the lower extremity of a forging or casting having arms 37. The cylinder walls 44 are interrupted by the partition 53 having apertures 54 therein. Above the partition 53 the cylinder walls again continue as at 44' to enclose the working parts. The upper extremity of the cylinder walls 44' carry a packing gland 55 to snugly engage the depending sleeve 41. The springs 56 and 57 carry the load and rest upon a steel bearing plate 58. A brass wearing plate 59 is interposed between the steel plate 58 and the partition 53 to facilitate pivotal motion in the fifth wheel.

The construction of the brass wearing plate 59 is illustrated in Figure 7. Radial grooves 60 are provided to establish fluid communication between an annular groove 61 and the central aperture 62 and the outer periphery of the plate, respectively. These grooves are arranged so that the annular groove 61 lies above the apertures 54.

In the embodiment illustrated in Figures 4, 5 and 6 applied to the fifth wheel construction of a full trailer, it will be noted that the arms 37 are disposed forwardly and rearwardly, or at right angles, to the direction of the axle 32. This is done to provide the greatest freedom for relative up and down movement of the respective front wheels 33 of the full trailer unit through the resilient action of the cushioning blocks 35.

Figure 8:
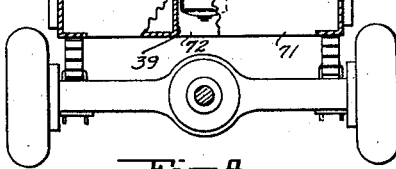
Figure 8 is a transverse sectional view showing the manner of application of the present invention to a semi-trailer unit.

In Figure 8 the elements of the invention are embodied in a further modification for application to a fifth wheel for a semi-trailer unit. In Figure 8 the fifth wheel unit 36' is the same as the unit 36 in Figures 4, 5 and 6, but it is mounted with the arms 37', corresponding to the previously mentioned arms 37, disposed parallel with the vehicle axle instead of at right angles to the axle. By this arrangement of the arms 37' there is provided the greatest possible accommodation for an annular movement between the semi-trailer and the truck, as in negotiating the crest of a hill or the bottom of a hollow on the highway. In Figure 8 the frame 70 of the semi-trailer is attached by welding or other convenient means to the upstanding flange 40' in the same manner as described in connection with Figure 4. The unit 36' is mounted on a cross member 71 on the truck to which the semi-trailer is attached, cross member 71 having a well 72 therein. The supporting arms 37' are mounted in cushioning blocks in a manner similar to the construction shown in Figures 5 and 6, except that as above pointed out, the arms 37' extend along and are parallel to the direction of the cross member 71.

It will be seen that the construction of the present invention provides a suspension for a vehicle or the like which is resilient, which functions as a shock absorber, and which has the characteristic of snubbing or preventing rebound. The action under loaded condition is best illustrated in Figure 9, where the parts are shown in the positions they would assume when the load carrying springs are compressed to the limit of their action. Figure 9 illustrates the behavior of the mechanism under load, whether this be the embodiment used on a tandem trailer unit, the fifth wheel for a full trailer unit, or the fifth wheel for a semi-trailer unit, although the specific embodiment shown in Figure 9 is illustrated as having the same construction as Figure 5.

At the moment of extreme shock when the load has compressed the load carrying springs to their utmost, the plate 43 will assume the position illustrated which represents the downward limit of its travel. However, at the moment the plate 43 arrives at the downward limit of its travel the floating plate 50 will not be resting thereupon as shown in full lines, but will be momentarily floating in some intermediate position, as indicated by the dotted line position of the plate 50', which may represent a momentary stationary or suspended condition of the plate 50, due to the upward flow of liquid through the openings 51, or which may represent merely the instantaneous position of the plate 50 in the course of its downward travel toward its final rest position on top of the plate 43. Assuming the plate 43 to be in an intermediate position with the floating plate 50 resting thereupon, it will be seen that downward motion of the piston rod 42 can be accomplished with less resistance than upward motion thereof. The degree of resistance to downward motion is controlled by the amount of the combined openings 51 and 52, while the resistance to upward travel is controlled by the size of the openings 54 and the clearance 52. The action of the present construction is very effective in its shock absorbing and rebound checking qualities in connection with heavy duty hauling and the like, where conventional suspension and shock absorbing devices have proved inadequate.

The preferred embodiments illustrated in the drawings teach how the present invention may be applied to different types of automotive trailers, but it is understood that the invention is not limited to the uses illustrated, as it may be applied by a mechanic skilled in the art to other heavy duty requirements, such as railway car suspension, heavy gun carriages, and the like.

Having now described my invention and in what manner the same may be used, what I claim as new and desire to protect by Letters Patent is:

1. A combination fifth wheel, spring, and shock absorber, comprising a vehicle frame, a fluid-filled chamber mounted in said frame, means for yieldably supporting said chamber in said frame and allowing a limited relative movement therebetween, a horizontal wall forming a closure member for said chamber; a second frame overlying said first named frame, a depending piston rod integral with said second frame, said piston rod extending through the aforesaid closure member and into said fluid-filled chamber, a piston-like member within said chamber integral with said piston rod, an opening in said member, a valve member operated by the liquid in said chamber to cover said opening when said piston-like member moves in one direction and to uncover said opening when said piston-like member moves in the opposite direction, and a load supporting spring surrounding said piston rod exteriorly of said chamber and urging said piston-like member toward a limit of its movement in said chamber.

2. A combination fifth-wheel, spring, and shock absorber, comprising a vehicle frame, a fluid-filled chamber mounted in said frame, means rockably supporting said chamber in said frame, a piston-like member movable in said chamber, an opening in said member, valve means to close said opening in response to movement of said member in one direction, a load supporting frame operably connected to said piston-like member, and a load supporting spring bearing at one end against a wall of said chamber and at its other end against said frame, and urging said piston-like member toward a limit of its movement in said chamber.

3. A combination fifth-wheel, spring and shock absorber, comprising a vehicle frame, a cylinder rigidly mounted in said frame and depending therefrom and having formed therewith a piston, a wheel-carrying axle, a second cylinder supported by said axle and having formed therewith a chamber adapted to be filled with a liquid, means yieldably supporting said second cylinder on said axle, said cylinders being telescopically mounted whereby said piston is operable within said chamber, an opening in said piston, valve means within said chamber to close said opening in response to movement of the piston in one direction, load supporting springs mounted within said cylinders exteriorly of said chamber for supporting said cylinders in extended position and urging said piston toward a limit of its movement, and a wearing plate in one of said cylinders for absorbing the friction created by relative rotation of said cylinders.

ROBERT W. POINTER.